US009797507B2

(12) United States Patent
Hwang

(10) Patent No.: US 9,797,507 B2
(45) Date of Patent: Oct. 24, 2017

(54) HYDRAULIC CONTROL APPARATUS FOR HYDRAULIC TORQUE CONVERTER

(71) Applicant: HYUNDAI MOTOR COMPANY, Seoul (KR)

(72) Inventor: Jin Young Hwang, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/168,931

(22) Filed: May 31, 2016

(65) Prior Publication Data

US 2017/0114890 A1    Apr. 27, 2017

(30) Foreign Application Priority Data

Oct. 26, 2015 (KR) .......................... 10-2015-0148979

(51) Int. Cl.

| F16H 61/14 | (2006.01) |
|---|---|
| F16D 48/02 | (2006.01) |
| F16H 61/00 | (2006.01) |
| F16D 13/76 | (2006.01) |
| F16H 45/02 | (2006.01) |
| F16D 25/0638 | (2006.01) |
| F16H 41/24 | (2006.01) |

(52) U.S. Cl.
CPC ............ *F16H 61/14* (2013.01); *F16D 13/76* (2013.01); *F16D 25/0638* (2013.01); *F16D 25/14* (2013.01); *F16D 48/02* (2013.01); *F16H 41/24* (2013.01); *F16H 61/0021* (2013.01); *F16D 2048/0287* (2013.01); *F16H 2045/0215* (2013.01)

(58) Field of Classification Search
CPC .............................................. F16H 2045/0215
See application file for complete search history.

(56) References Cited

U.S. PATENT DOCUMENTS

| 5,549,184 A | 8/1996 | Loffler et al. |
|---|---|---|
| 8,066,618 B2 | 11/2011 | Noda et al. |

FOREIGN PATENT DOCUMENTS

| JP | 2011-256991 A | 12/2011 |
|---|---|---|
| JP | 2014-114876 A | 6/2014 |
| KR | 10-2006-0084640 A | 7/2006 |
| KR | 10-2013-0065410 A | 6/2013 |
| WO | 2013/084993 A1 | 6/2013 |

*Primary Examiner* — Mark Manley
(74) *Attorney, Agent, or Firm* — McDermott Will & Emery LLP

(57) ABSTRACT

A hydraulic pressure control circuit of a torque converter includes a torque converter control valve for controlling a line pressure supplied from a line regulator valve stably controlling a hydraulic pressure supplied from a hydraulic pump to be directly supplied to a fluid chamber inside a torque converter case as an operation hydraulic pressure, a reducing valve for stably controlling the hydraulic pressure, a torque converter control solenoid valve for controlling the hydraulic pressure supplied from the line regulator valve to be supplied to an engage hydraulic chamber of the lock-up clutch, and a switch valve for supplying the hydraulic pressure supplied from the reducing valve to a releasing hydraulic chamber of the lock-up clutch or exhausting the hydraulic pressure of the releasing hydraulic chamber of the lock-up clutch while being controlled by a control pressure of the torque converter control solenoid valve.

3 Claims, 3 Drawing Sheets

HYDRAULIC CONTROL APPARATUS FOR HYDRAULIC TORQUE CONVERTER

CROSS-REFERENCE TO RELATED APPLICATION

This application claims the benefit of priority to Korean Patent Application No. 10-2015-0148979, filed with the Korean Intellectual Property Office on Oct. 26, 2015, the entire contents of which are incorporated herein by reference.

TECHNICAL FIELD

The present disclosure relates to a hydraulic pressure control circuit of a torque converter applied to an automatic transmission of a vehicle. More particularly, the present disclosure relates to a hydraulic pressure control circuit of a torque converter separately controlling a lock-up clutch built in a 4-way separate chamber multi-plate clutch torque converter from an operation pressure in a torque converter.

BACKGROUND

Recently, vehicle makers have developed vehicles with enhanced fuel consumption as central tasks due to global high oil prices and regulations of carbon dioxide ($CO_2$). The technological development of the enhancement of fuel consumption and environmentally-friendly vehicles includes a torque converter applied to an automatic transmission of the vehicle.

The torque converter of the automatic transmission includes an impeller directly receiving a rotation power of the engine, a turbine arranged opposite to the impeller and driven by a fluid supplied from the impeller, and a stator disposed inside facing parts of the impeller and the turbine and executing an operation of torque multiplication.

Also, a torque converter of the automatic transmission has a lock-up clutch capable of directly and mechanically transmitting the torque in a high speed range, and the lock-up clutch is disposed at a space formed between a front cover directly connected to the impeller as the rotation member of an input side of the torque converter and the turbine as the rotation member of an output side.

Also, as the lock-up clutch is operated in the high speed range except for an oscillation using the torque multiplication operation or a shift that is necessary to allow for a relative rotation of the impeller and the turbine, the fuel consumption performance may be improved.

However, since the general lock-up clutch allows the hydraulic pressure that is filled to transmit the power between the impeller and the turbine in the torque converter case to be supplied as an engage hydraulic pressure, the effective control may be obtained.

In more detail, to transmit the power between the impeller and the turbine, operation oil is filled in a case of the torque converter, however the hydraulic pressure in the case is largely changed depending on the rotation speed of the impeller, the rotation speed of the turbine, and the relative speed ration of the impeller and the turbine.

When the operation hydraulic pressure is acts upon the piston of the lock-up clutch as the engage hydraulic pressure, since the engage force acting on the lock-up clutch is changed, the engage and slip control of the lock-up clutch is not properly executed.

Also, to act as the engage hydraulic pressure of the lock-up clutch, since the operation hydraulic pressure must be actually applied with high pressure over the operation hydraulic pressure, a hydraulic pump of high-capacity is required, a power delivery efficiency of the transmission is resultantly deteriorated, and the fuel consumption performance is deteriorated due to the increasing of the engine load.

The above information disclosed in this Background section is only for enhancement of understanding of the background of the disclosure and therefore it may contain information that does not form the prior art that is already known in this country to a person of ordinary skill in the art.

SUMMARY

An exemplary embodiment of the present disclosure provides a hydraulic pressure control circuit of a torque converter controlling the lock-up clutch built in the 4-way separate chamber multi-plate clutch torque converter as the engage hydraulic pressure separated from the operation pressure in the torque converter to increase a control characteristic of the lock-up clutch and the power delivery performance, thereby obtaining a fuel consumption performance improvement.

According to one or a plurality of exemplary embodiments of the present disclosure provides, in a torque converter for a 4-way separate chamber multi-plate clutch having a supply line and an exhaust line supplying and exhausting an operation hydraulic pressure in a torque converter, and an engagement and releasing hydraulic chamber line supplying and exhausting an engagement and releasing hydraulic pressure to an engage hydraulic chamber and a releasing hydraulic chamber of a lock-up clutch in the torque converter, a hydraulic pressure control circuit of the torque converter includes a torque converter control valve controlling a line pressure supplied from a line regulator valve stably controlling a hydraulic pressure supplied from a hydraulic pump to be directly supplied to a fluid chamber inside a torque converter case as an operation hydraulic pressure; a reducing valve stably controlling the hydraulic pressure supplied from the line regulator valve to be decreased; a torque converter control solenoid valve controlling the hydraulic pressure supplied from the line regulator valve to be supplied to an engage hydraulic chamber of the lock-up clutch; and a switch valve supplying the hydraulic pressure supplied from the reducing valve to a releasing hydraulic chamber of the lock-up clutch or exhausting the hydraulic pressure of the releasing hydraulic chamber of the lock-up clutch while being controlled by a control pressure of the torque converter control solenoid valve.

The switch valve may include a first port receiving the hydraulic pressure from the reducing valve; a second port supplying the hydraulic pressure supplied to the first port to the releasing hydraulic chamber; a third port exhausting the hydraulic pressure exhausted from the second port; and a fourth port receiving the control pressure from the torque converter control solenoid valve.

A check valve may be connected to the third port of the switch valve such that the hydraulic pressure of a remaining pressure level is maintained to the releasing hydraulic chamber.

According to an exemplary embodiment of the present disclosure, in the torque converter of the 4-way separate chamber multi-plate clutch type, the control of the engagement and the releasing of the lock-up clutch in the torque converter may be independently executed regardless of the operation hydraulic pressure.

Accordingly, as the load of the hydraulic pump is reduced by rather decreasing the line pressure for the engagement of the lock-up clutch without the need of the increasing, the power delivery performance and the fuel consumption performance of the vehicle may be improved.

Also, because the engagement and the engagement releasing of the lock-up clutch may be controlled by the torque converter control solenoid valve, and the switch valve and the check valve, the control stability may be improved.

Further, effects that can be obtained or expected from exemplary embodiments of the present disclosure are directly or suggestively described in the following detailed description. That is, various effects expected from exemplary embodiments of the present disclosure will be described in the following detailed description.

DETAILED DESCRIPTION

Figure 1:
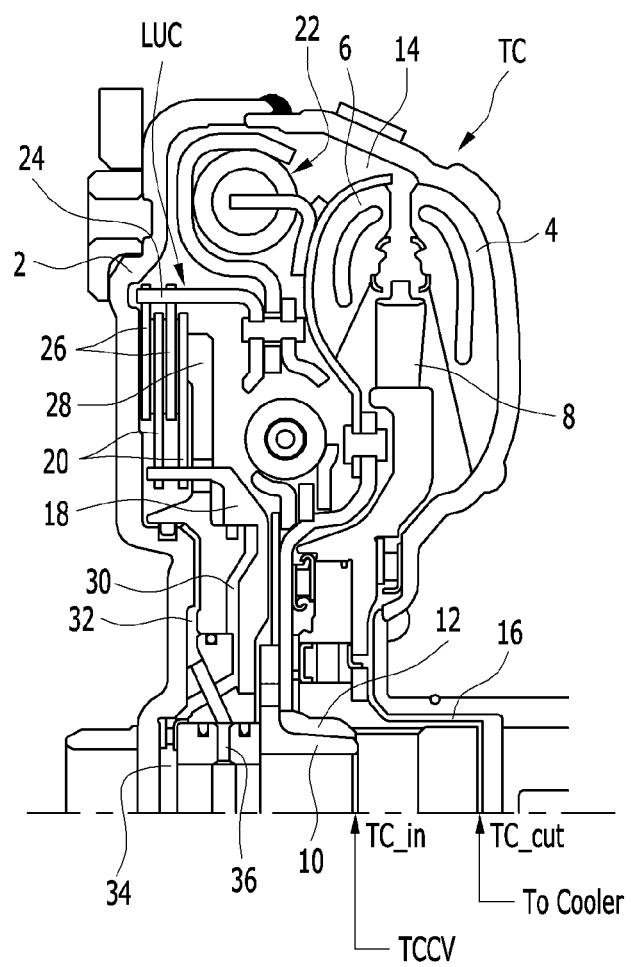
FIG. 1 is a half cross-sectional view of a 4-way separate chamber torque converter of a hydraulic pressure control circuit of a torque converter according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Parts not relevant to description of exemplary embodiments of the present disclosure are omitted for describing the present disclosure clearly, and throughout the specification, identical or similar elements are given the same reference numerals.

FIG. 1 is a half cross-sectional view of a 4-way separate chamber torque converter of a hydraulic pressure control circuit of a torque converter according to an exemplary embodiment of the present disclosure.

Referring to FIG. 1, a torque converter TC may include a front cover 2, an impeller 4, a turbine 6 and a stator 8.

The front cover 2 may be connected to a crank shaft (not shown) of an engine to rotate together with the engine.

The impeller 4 may be connected to the front cover 2 to rotate together with the front cover 2.

The turbine 6 may be disposed so as to face the impeller 4, and drive an input shaft of a transmission through a turbine hub 10 while rotating by a fluid supplied from the impeller 4.

The stator 8 may be disposed so as to rotate in only one direction by a one-direction clutch between the impeller 4 and the turbine 6, and change a flow of a fluid (oil for an automatic transmission) coming out from the turbine 6 to transfer the fluid to the impeller 4.

The stator 8 may have the same rotation center as that of the front cover 2.

The fluid may be supplied to the fluid chamber 14 inside the torque converter case through the supply line 12 and may be exhausted through a discharge line 16, and may then be supplied to a cooler through a cooling and lubrication part.

Also, the lock-up clutch LUC, used as a means directly connecting the engine and the transmission, may be disposed between the front cover 2 and the turbine 6 inside the torque converter TC.

The lock-up clutch LUC may have a boss 18 fixed to the front cover 2 and a clutch plate 20 supported to the boss 18 in the rotating direction.

Also, the lock-up clutch LUC may have a clutch retainer 24 connected to the turbine 6 through the damper assembly 22 fixed to the turbine 6 and a clutch disk 26 supported to the clutch retainer 24 in the rotating direction between the clutch plate 20.

The lock-up clutch LUC may have a piston 28 at the rear side of the clutch plate 20, and the clutch plate 20 and the clutch disk 26 may be compressed by pressure of the piston 28, such that the lock-up clutch LUC becomes an engagement state.

Also, an engage hydraulic chamber 30 may be formed between the piston 28 and the boss 18, and a releasing hydraulic chamber 32 may be formed between the piston 28 and the front cover 2.

Accordingly, if the clutch engage hydraulic pressure is supplied to the engage hydraulic chamber 30 through the engage hydraulic chamber line 34, the piston 28 may engage the lock-up clutch LUC while the piston 28 moves forward to the left in the accompanying drawing.

Also, if the clutch releasing hydraulic pressure is supplied to the releasing hydraulic chamber 32 through the releasing hydraulic chamber line 36 and simultaneously the hydraulic pressure of the engage hydraulic chamber 30 is exhausted through the engage hydraulic chamber line 34, the piston 28 may move backward in the right in the accompanying drawing and the engagement state of the lock-up clutch LUC is released.

Figure 2:
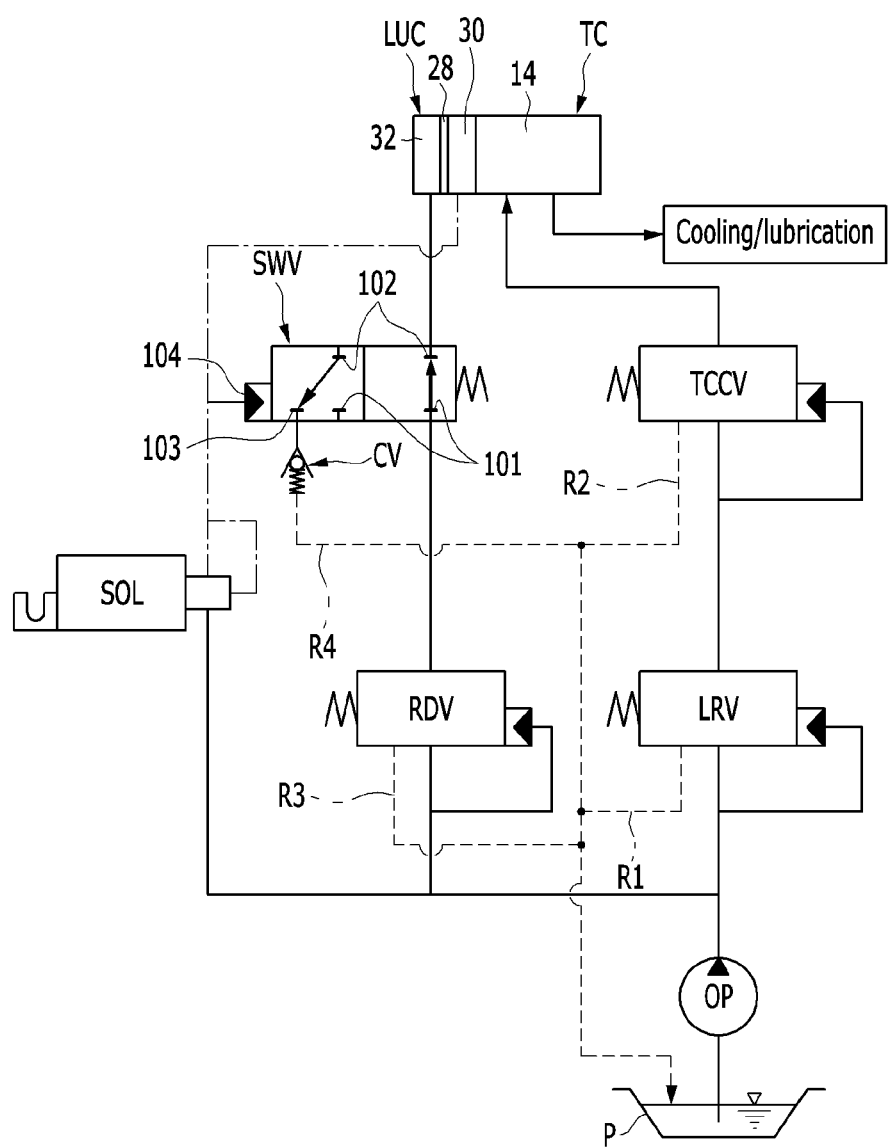
FIG. 2 is a view showing a non-operation state of a lock-up clutch as a hydraulic pressure control circuit diagram of a torque converter according to an exemplary embodiment of the present disclosure.

FIG. 2 is a view showing a non-operation state of a lock-up clutch as a hydraulic pressure control circuit diagram of a torque converter according to an exemplary embodiment of the present disclosure.

Referring to FIG. 2, the hydraulic pressure of the fluid chamber 14 inside the torque converter TC may be controlled by the torque converter control valve TCCV, and the torque converter control valve TCCV may stably control a line pressure supplied from the line regulator valve LRV to be directly supplied to the fluid chamber 14 of the torque converter TC as the operation hydraulic pressure.

The line regulator valve LRV may recycle the part of the hydraulic pressure supplied from the hydraulic pump OP to the oil pan P through the first recirculation line R1 and stably control the hydraulic pressure to be supplied to the torque converter control valve TCCV.

Thus, while the part of the hydraulic pressure supplied from the line regulator valve LRV may be recycled to the oil pan P through the second recirculation line R2 in the torque converter control valve TCCV, the hydraulic pressure may be stably controlled to be supplied to the fluid chamber 14 of the torque converter TC through the supply line 12, thereby being the operation hydraulic pressure of the torque converter TC.

Also, the hydraulic pressure exhausted from the fluid chamber 14 of the torque converter TC through the discharge line 16 may be supplied as the cooling and lubrication hydraulic pressure.

Also, the hydraulic pressure of the engage hydraulic chamber 30 and the releasing hydraulic chamber 32 of the lock-up clutch RUC may be controlled by the torque converter control solenoid valve SOL and the switch valve SWV, and the switch valve SWV may receive the hydraulic pressure from the reducing valve RDV controlling the hydraulic pressure suppled from the line regulator valve LRV to be decreased.

The hydraulic pressure of the engage hydraulic chamber 30 of the lock-up clutch RUC may be controlled by the torque converter control solenoid valve SOL to be supplied, the torque converter control solenoid valve SOL may control the line pressure if the line pressure is supplied from the line regulator valve LRV to be supplied to the engage hydraulic chamber 30 of the lock-up clutch RUC and the part of the hydraulic pressure may be simultaneously supplied as the control pressure of the switch valve SWV.

The reducing valve RDV may control the hydraulic pressure to be decreased while recycling the part of the hydraulic pressure supplied from the line regulator valve LRV to the oil pan P through the third recirculation line R3 to be supplied to the switch valve SWV, and the switch valve SWV may supply or block the hydraulic pressure to the releasing hydraulic chamber 32 of the lock-up clutch LUC while being controlled by the torque converter control solenoid valve SOL.

Here, the switch valve SWV may be made of a spool valve, although it is not shown specifically in the accompanying drawings, however the valve body may be formed by including a first port 101 receiving the hydraulic pressure from the reducing valve RDV, a second port 102 supporting the hydraulic pressure supplied to the first port 101 to the releasing hydraulic chamber 32 of the lock-up clutch RUC, a third port 103 exhausting the hydraulic pressure exhausted from the second port 102, and a fourth port 104 receiving the control pressure from the torque converter control solenoid valve SOL.

That is, referring to FIG. 2, if the control pressure less than a reference value is supplied from the torque control solenoid valve SOL or the control pressure is not supplied, the first port 101 and the second port 102 may be connected such that the operation of the lock-up clutch RUC is released while the hydraulic pressure supplied from the reducing valve RDV is supplied to the releasing hydraulic chamber 32 of the lock-up clutch RUC.

Also, the third port 103 may be connected to the check valve CV, and the check valve CV may be connected to the oil pan P through the fourth recirculation line R4.

The check valve CV may execute a role of transmitting the hydraulic pressure in one direction and simultaneously maintaining the hydraulic pressure exhausted through the third port 103 as a pressure of a remaining pressure level (about 0.1-0.2 bar).

The configuration of the check valve CV may be a typical configuration and a detailed description thereof will be omitted.

On the other hand, referring to FIG. 2, the first, second, third, and fourth recirculation lines R1, R2, R3, and R4 all may recycle the exhaust pressure to the oil pan P, however their operation is not limited thereto and the recirculation lines may be connected to an input line of the hydraulic pump OP.

Figure 3:
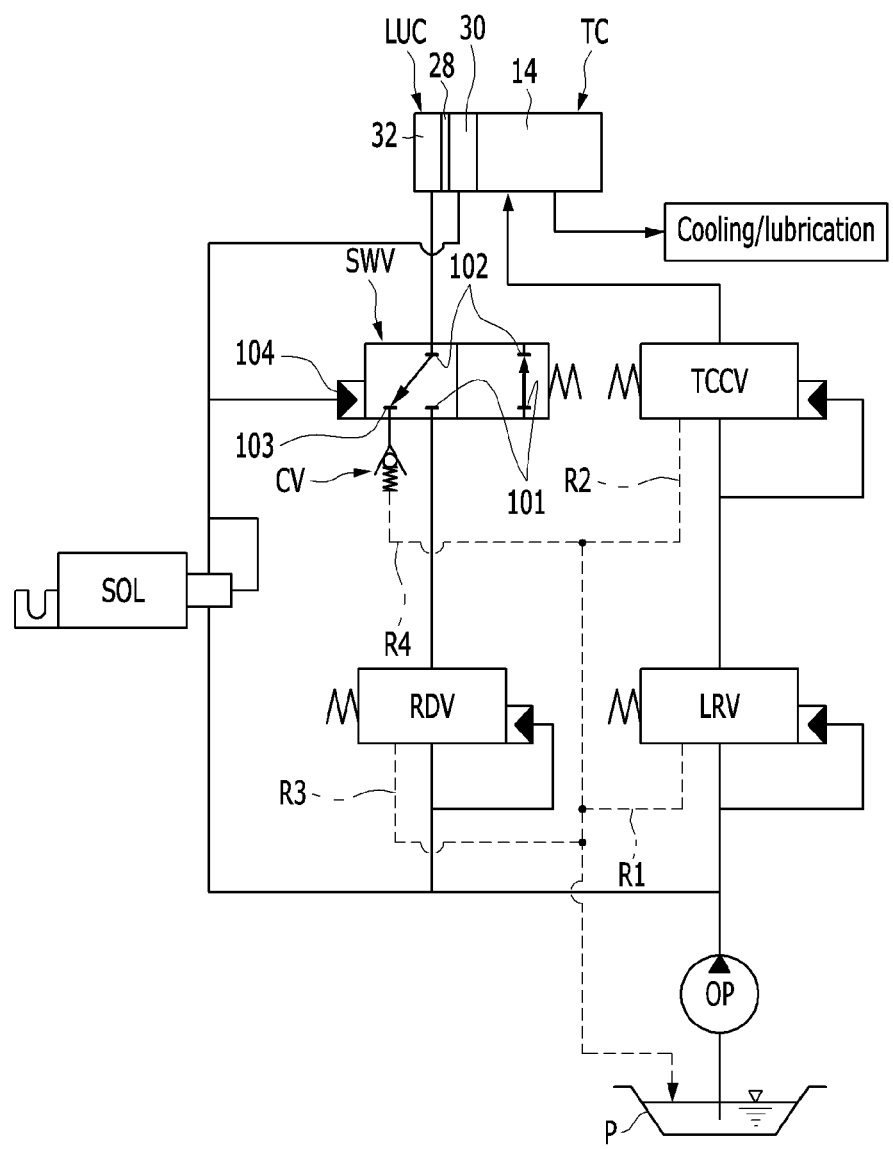
FIG. 3 is a view showing an operation state of a lock-up clutch as a hydraulic pressure control circuit diagram of a torque converter according to an exemplary embodiment of the present disclosure.

FIG. 3 is a view showing an operation state of a lock-up clutch as a hydraulic pressure control circuit diagram of a torque converter according to an exemplary embodiment of the present disclosure.

Referring to FIG. 3, the line of the switch valve SWV may be switched during the operation control of the lock-up clutch RUC such that the second port 102 and the third port 103 are connected to block the hydraulic pressure supplied from the reducing valve RDV.

Accordingly, the hydraulic pressure of the releasing hydraulic chamber 32 may be exhausted while maintaining the remaining pressure by the check valve CV, and the engage hydraulic chamber 30 may be supplied with the control pressure of the torque converter control solenoid valve SOL to control the lock-up clutch RUC to be engaged.

As described above, according to an exemplary embodiment of the present disclosure, for the torque converter TC of the 4-way separate chamber multi-plate clutch type, the engage and engage release control of the lock-up clutch RUC may be independently executed regardless of the operation hydraulic pressure in the torque converter TC.

That is, for the engagement of the lock-up clutch RUC, as the line pressure is lower without having to be raised to reduce the load of the engine, the power delivery performance of the vehicle and the fuel consumption performance may be improved.

Also, since the engagement and the engagement releasing of the lock-up clutch RUC may be controlled by the torque converter control solenoid valve SOL, the switch valve SWV, and the check valve CV, the control stability may be improved.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. In a torque converter for a 4-way separate chamber multi-plate clutch having a supply line and an exhaust line for supplying and exhausting an operation hydraulic pressure in a torque converter, and an engagement and releasing hydraulic chamber line for supplying and exhausting an engagement and releasing hydraulic pressure to an engage hydraulic chamber and a releasing hydraulic chamber of a lock-up clutch in the torque converter, a hydraulic pressure control circuit of the torque converter comprising: a torque converter control valve for controlling a line pressure supplied from a line regulator valve stably controlling a hydraulic pressure supplied from a hydraulic pump to be directly supplied to a fluid chamber inside a torque converter case as an operation hydraulic pressure; a reducing valve for stably controlling the hydraulic pressure supplied from the hydraulic pump to be decreased; a torque converter control solenoid valve for controlling the hydraulic pressure supplied from the line regulator valve to be supplied to an engage hydraulic chamber of the lock-up clutch; and a switch valve for supplying the hydraulic pressure supplied from the reducing valve to a releasing hydraulic chamber of the lock-up clutch or exhausting the hydraulic pressure of the releasing hydraulic chamber of the lock-up clutch while being controlled by a control pressure of the torque converter control solenoid valve.

2. The hydraulic pressure control circuit of claim 1, wherein the switch valve includes:
   a first port for receiving the hydraulic pressure from the reducing valve;
   a second port for supplying the hydraulic pressure supplied to the first port to the releasing hydraulic chamber;

a third port for exhausting the hydraulic pressure exhausted from the second port; and a fourth port for receiving the control pressure from the torque converter control solenoid valve.

3. The hydraulic pressure control circuit of claim 2, wherein a check valve is connected to the third port of the switch valve such that the hydraulic pressure of a remaining pressure level is maintained to the releasing hydraulic chamber.

\* \* \* \* \*